(12) United States Patent
Okano

(10) Patent No.: US 7,174,731 B2
(45) Date of Patent: Feb. 13, 2007

(54) ROTATIONAL SPEED CONTROL SYSTEM, ROTATINGLY DRIVING SYSTEM, AIR BLOW SYSTEM, CLEAN BENCH, OUTDOOR UNIT OF AIR CONDITIONER

(75) Inventor: Takashi Okano, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 132 days.

(21) Appl. No.: 10/502,783

(22) PCT Filed: Jan. 31, 2003

(86) PCT No.: PCT/JP03/00970

§ 371 (c)(1),
(2), (4) Date: Jul. 28, 2004

(87) PCT Pub. No.: WO03/065565

PCT Pub. Date: Aug. 7, 2003

(65) Prior Publication Data

US 2005/0115256 A1 Jun. 2, 2005

(30) Foreign Application Priority Data

Jan. 31, 2002 (JP) ............................. 2002-023605

(51) Int. Cl.
*F25B 39/04* (2006.01)
*H02P 5/00* (2006.01)
*H02K 7/18* (2006.01)
*H02B 11/00* (2006.01)
*F04B 41/06* (2006.01)

(52) U.S. Cl. .............................. 62/183; 318/67; 322/9; 322/39; 417/2

(58) Field of Classification Search .................. 318/66, 318/67, 77; 322/9, 16, 39; 62/183; 417/2
See application file for complete search history.

(56) References Cited

U.S. PATENT DOCUMENTS 6,398,505 B1 * 6/2002 Sekiguchi ..................... 417/2
6,814,546 B2 * 11/2004 Sekiguchi ..................... 417/3

(Continued)

FOREIGN PATENT DOCUMENTS

JP 2001-63005 A 6/1990

(Continued)

*Primary Examiner*—Marc Norman
(74) *Attorney, Agent, or Firm*—Birch, Stewart, Kolasch & Birch, LLP

(57) ABSTRACT

This invention relates to a rotational speed control system including a plurality of motor drivers for driving motors, and the object thereof is to drive a plurality of motors at the same rotational speed without depending on the number of motor drivers and without depending on the characteristics of each motor driver. A remote controller 31 and a motor driver 202 are connected to a motor driver 201. The motor drivers 201 and 202 control motors $M_{11}$ and $M_{12}$ at a prescribed rotational speed, respectively. A rotational speed instructing signal 91 indicative of the rotational speed is supplied from the remote controller 31 to the motor driver 201, and further supplied from the motor driver 201 to the motor driver 202. Because the rotational speed instructing signal 91 indicates a rotational speed which is transmitted in a digital value between the motor drivers 201 and 202, both of the motors $M_{11}$ and $M_{12}$ are driven at the rotational speed indicated by the rotational speed instructing signal 91.

12 Claims, 4 Drawing Sheets

U.S. PATENT DOCUMENTS

| | | | | |
|---|---|---|---|---|
| 6,851,593 | B2* | 2/2005 | Weber et al. | 226/188 |
| 2005/0046362 | A1* | 3/2005 | Ma et al. | 318/77 |

FOREIGN PATENT DOCUMENTS

| | | | |
|---|---|---|---|
| JP | 8-42885 A | | 2/1996 |
| JP | 10-304696 A | | 11/1998 |
| JP | 10304696 A | * | 11/1998 |
| JP | 11-94418 A | | 4/1999 |
| JP | 2001-339411 A | | 12/2001 |
| JP | 2001339411 A | * | 12/2001 |
| JP | 2002-54830 A | | 2/2002 |

* cited by examiner

F I G . 5
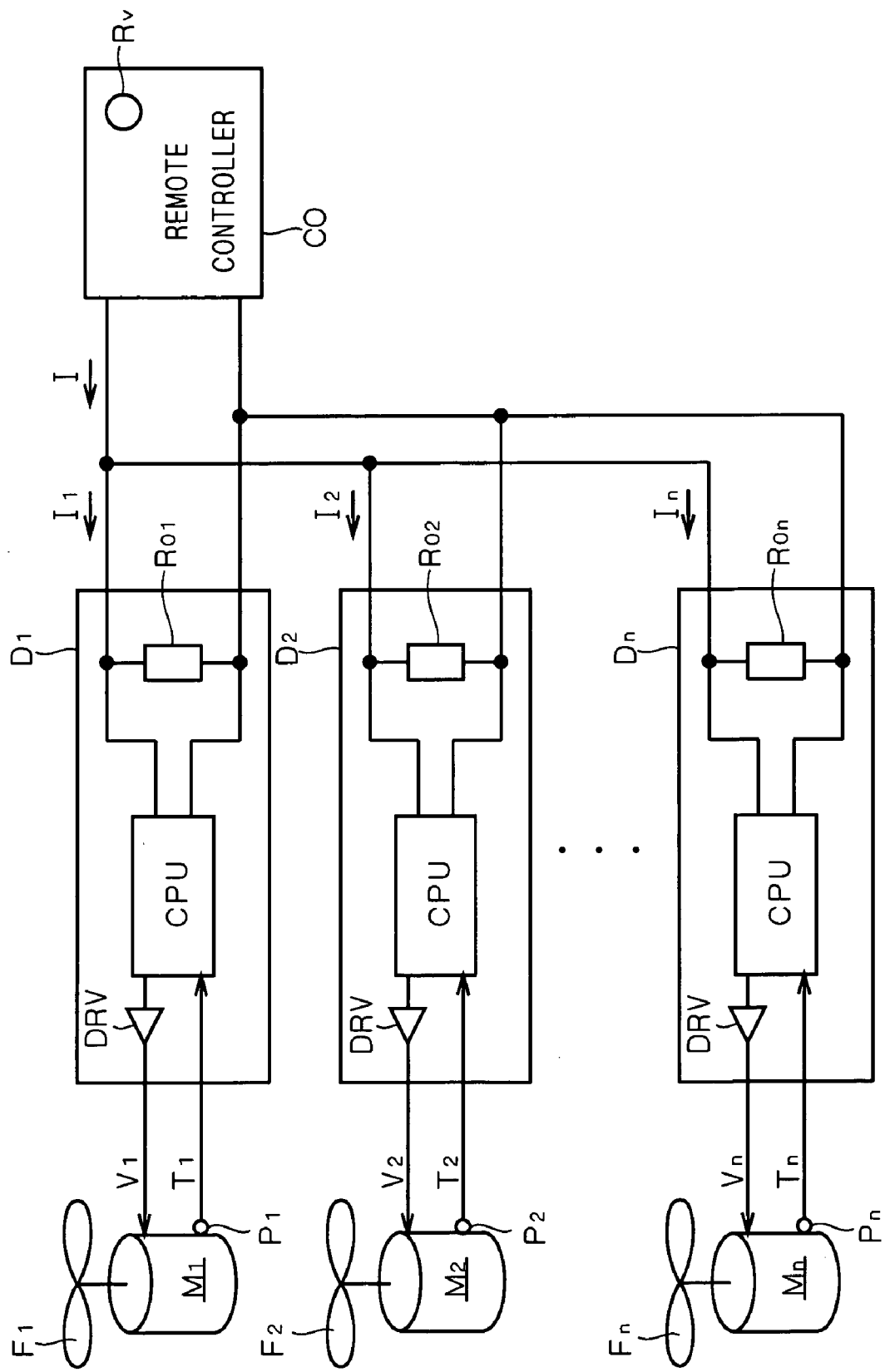

ROTATIONAL SPEED CONTROL SYSTEM, ROTATINGLY DRIVING SYSTEM, AIR BLOW SYSTEM, CLEAN BENCH, OUTDOOR UNIT OF AIR CONDITIONER

TECHNICAL FIELD

This invention relates to a rotational speed control system including a plurality of motor drivers for driving motors. This invention is applicable to a clean bench and an air blow system blowing air into the clean bench, and an outdoor unit of an air conditioner using the air blow system.

BACKGROUND ART

Conventionally, it has been sometimes required that a plurality of motors be rotated at the same rotational speed. FIG. 5 is a block diagram showing the configuration of a publicly worked air blow system that provides the same quantity of air from a plurality of fans. Because n fans $F_1, F_2, \ldots F_n$ are designed in accordance with the same specifications, motors $M_1, M_2, \ldots M_n$ for rotating the respective fans are set to be rotated at the same rotational speed.

The motors $M_1, M_2, \ldots M_n$ are driven by motor drivers $D_1, D_2, \ldots D_n$ respectively. The motor drivers $D_1, D_2, \ldots D_n$ supply driving voltages $V_1, V_2, \ldots V_n$ to the motors $M_1, M_2, \ldots M_n$ respectively. The rotational speeds $T_1, T_2, \ldots T_n$ of the motors $M_1, M_2, \ldots M_n$ are detected by rotational speed detectors $P_1, P_2, \ldots P_n$ respectively and sent to the motor drivers $D_1, D_2, \ldots D_n$.

Motor drivers $D_i$ (i=1, 2, ..., n) each include a resistor $R_{0i}$. In each of the motor drivers $D_i$, a voltage across the resistor $R_{0i}$ is input to an operation unit CPU which determines a driving voltage $V_i$ based on this voltage and allows a driving circuit DRV to supply the driving voltage $V_i$ to a motor $M_i$.

The voltages across the resistors $R_{0i}$ depend on a current I supplied from a remote controller CO and the number n of the motor drivers $D_i$. The motor drivers $D_i$ are all designed in accordance with the same specifications, and ideally an equation (1) holds:

$$R_{01}=R_{02}=\ldots=R_{0n}=R_0 \quad (1)$$

Accordingly, when the motor drivers $D_1, D_2, \ldots D_n$ are connected in parallel with respect to the remote controller CO as shown in FIG. 5, based on the assumption that the input impedance of the operation unit CPU is sufficiently high, currents $I_1, I_2, \ldots, I_n$ flowing through the resistors $R_{01}, R_{02}, \ldots, R_{0n}$ respectively are equal to each other, and an equation (2) holds:

$$I_1=I_2=\ldots=I_n=I/n \quad (2)$$

Because the motor drivers $D_i$ are all designed in accordance with the same specifications, an equation (3) holds for the driving voltages:

$$V_1=V_2=\ldots=V_n \quad (3)$$

Thus, when the motors $M_1, M_2, \ldots M_n$ are designed in accordance with the same specifications, the rotational speeds $T_1, T_2, \ldots T_n$ are equal to each other, whereby the same quantity of air is provided from the n fans $F_1, F_2, \ldots F_n$.

The rotational speeds $T_1, T_2, \ldots T_n$ are adjusted by adjusting the magnitude of the current I supplied from the remote controller CO. For this reason, the remote controller CO is provided with a variable resistor Rv for current value setting.

As described above, in the conventional technique, the current I is supplied from the remote controller CO and the magnitude of the current I is adjusted to thereby adjust the same quantity of air provided from the n fans $F_1, F_2, \ldots F_n$. Therefore, the rotational speed fluctuates only slightly even when the distance between the remote controller CO and the motor drivers $D_1, D_2, \ldots D_n$ increases which leads to a lot of resistance in the wiring length between them. It is also resistant to extraneous noise.

However, as is evident from the equation (2), a current $I_i$ that is supplied to each of the motor drivers $D_i$ and generates the voltage across the resistor $R_{0i}$ depends on the number n of the motor drivers $D_i$. Therefore, a voltage input to the operation unit CPU in each of the motor drivers $D_i$ varies when the number n of the motor drivers varies.

On the other hand, because the single remote controller CO is connected to a plurality of motor drivers, the current I output from itself and the same quantity of air provided from a plurality of fans are set in one relationship without consideration of the number n. Therefore, in order to obtain the quantity of air in accordance with the relationship set at the remote controller CO even when the number n varies, it is necessary to reset the relationship between the voltage across the resistor $R_{0i}$ and the driving voltage $V_i$ at each of the motor drivers $D_i$.

Besides, although the equation (1) holds ideally, the values of the resistors $R_{0i}$ sometimes vary among the motor drivers $D_i$. In that case, the current $I_i$ supplied to each of the motor drivers $D_i$ also varies, which in turn may cause rotational speeds $T_i$ to vary. And in that case, the quantities of air provided from the fans $F_1, F_2, \ldots F_n$ will vary as well.

DISCLOSURE OF INVENTION

This invention has been made in view of the above circumstances, and provides a technique for driving a plurality of motors at the same rotational speed without depending on the number of motor drivers and without depending on the characteristics of each motor driver.

In a first aspect of this invention, a rotational speed control system comprises:

(a) at least one or more motor drive chains (71; 72) each comprising: (a-1) rotational speed instructing means (31; 32) outputting a rotational speed instructing signal (91; 92) setting a motor rotational speed; (a-2) a first motor driver (201; 211) receiving the rotational speed instructing signal from the rotational speed instructing means and driving a motor ($M_{11}$; $M_{21}$) corresponding to itself based on the rotational speed instructing signal; and (a-3) at least one second motor driver (202 to 206; 212) capable of communicating with the first motor driver in a digital value, receiving the rotational speed instructing signal from the first motor driver and driving a motor ($M_{12}$ to $M_{16}$; $M_{22}$) corresponding to itself based on the rotational speed instructing signal, and (b) central monitoring means (10) monitoring the operations of the first and second motor drivers in units of the motor drive chains by communicating with the first motor driver of each of the motor drive chains.

According to the rotational speed control system of the first aspect of this invention, because the rotational speed instructing signal setting the motor rotational speed is set, supplied to the first motor driver, and also to the second motor driver in a digital value, a plurality of motors can be driven at the same rotational speed in units of air blow chains without depending on the number of motor drivers and without depending on the characteristics of each motor driver.

In a second aspect of this invention, in the rotational speed control system according to the first aspect, in each of the motor drive chains ($71$; $72$), (a-4) an in-chain wiring ($51$; $52$) connecting the first motor driver ($201$; $211$) and the second motor driver ($202$; $212$) to each other is further provided.

According to the rotational speed control system of the second aspect of this invention, the rotational speed instructing signal is supplied from the first motor driver to the second motor driver via the in-chain wiring.

In a third aspect of this invention, in the rotational speed control system according to the first aspect, the motor drive chains ($71$; $72$) include a plurality of motor drive chains.

According to the rotational speed control system of the third aspect of this invention, the motors can be driven at an equal rotational speed in units of motor drive chains.

In a fourth aspect of this invention, in the rotational speed control system according to the third aspect, the first motor driver ($201$; $211$) of each of the plurality of motor drive chains ($71$; $72$) interrupts communication with the central monitoring means ($10$) when an abnormal condition occurred in the motor drive chain ($71$; $72$) to which it belongs.

According to the rotational speed control system of the fourth aspect of this invention, the central monitoring means can intensively monitor the state of operation of one motor drive chain without being hampered by an abnormal condition that occurred in the other motor drive chain.

In a fifth aspect of this invention, in the rotational speed control system according to the fourth aspect, the first motor driver ($201$; $211$) includes: a communication/control circuit ($83$) driving the motor ($M_{11}$; $M_{21}$) corresponding to itself based on the rotational speed instructing signal and capable of communicating with the central monitoring means ($10$); a connector ($84$) connected to the central monitoring means; and switches ($85$) interposed between the connector and the communication/control circuit, and the switches are interrupted in the motor drive chain in which an abnormal condition occurred.

According to the rotational speed control system of the fifth aspect of this invention, the communication in the fourth aspect can be interrupted.

In a sixth aspect of this invention, in the rotational speed control system according to the fifth aspect, the second motor driver ($202$ to $206$; $212$) includes a communication/control circuit ($83$) capable of communicating with the communication/control circuit ($83$) of the first motor driver ($201$; $211$) in a digital value via the in-chain wiring ($51$; $52$), and driving the motor ($M_{12}$ to $M_{16}$; $M_{22}$) corresponding to itself based on the rotational speed instructing signal ($91$; $92$).

According to the rotational speed control system of the sixth aspect of this invention, the rotational speed instructing signal is supplied from the first motor driver to the second motor driver via the in-chain wiring.

In a seventh aspect of this invention, in the rotational speed control system according to the first aspect, in the motor drive chain ($71$), the second motor driver ($202$ to $206$) includes a plurality of second motor drivers, each of which is set with a unique identification code, and the identification codes and the rotational speed instructing signal are transmitted from the first motor driver ($201$) to the second motor drivers ($202$ to $206$).

In an eighth aspect of this invention, in the rotational speed control system according to the seventh aspect, the identification codes and the rotational speed instructing signal are transmitted from the second motor drivers ($202$ to $206$) to the first motor driver ($201$) in the motor drive chain ($71$).

According to the rotational speed control systems of the seventh and eighth aspects of this invention, whether the information transmitted from the first motor driver was correctly transmitted to the second motor drivers can be confirmed, which in turn allows the transmission again from the first driver to the second drivers when the information was not correctly transmitted due to contamination with noise or the like.

In a ninth aspect of this invention, in the rotational speed control system according to the seventh aspect, a code corresponding to a failure that occurred in the second motor driver ($201$ to $206$) is transmitted from the second motor driver to the first motor driver ($201$).

According to the rotational speed control system of the ninth aspect of this invention, the central monitoring means is allowed to recognize what kind of failure has occurred in which slave driver.

In a tenth aspect of this invention, in the rotational speed control system according to the first aspect, in the motor drive chain ($71$), the second motor driver ($202$ to $206$) is divided into a plurality of sub-motor drive chains ($71a$, $71b$), and each of the sub-motor drive chains is set with a unique identification code, and the identification codes and the rotational speed instructing signal are transmitted from the first motor driver ($201$) to the sub-motor drive chains.

According to the rotational speed control system of the tenth aspect of of this invention, the sub-motor drive chains can be controlled by different rotational speeds from one another.

In an eleventh aspect of this invention, a rotational driving system comprises: the rotational speed control system recited in any one of first to tenth aspects; and motors ($M_{11}$ to $M_{16}$; $M_{21}$, $M_{22}$) in accordance with the same specifications that are provided correspondingly to respective ones of the motor drivers and the rotational speeds thereof are controlled by the motor drivers corresponding to themselves.

According to the rotational driving system of the eleventh aspect of this invention, rotational driving can be supplied to loads on the motors at an equal rotational speed when the loads are equal to each other.

In a twelfth aspect of this invention, an air blow system comprises: the rotational driving system recited in the eleventh aspect, and a plurality of fans ($F_{11}$ to $F_{16}$; $F_{21}$, $F_{22}$) in accordance with the same specifications that are provided correspondingly to respective ones of the motors ($M_{11\,to\,M16}$; $M_{21}$, $M_{22}$) and rotationally driven by the motors corresponding to themselves.

According to the air blow system of the twelfth aspect of this invention, an equal quantity of air can be blown into a plurality of locations having intake conductance and exhaust conductance equal to each other.

In a thirteenth aspect of this invention, a clean bench (CB) comprises the air blow system according to the twelfth aspect.

According to the clean bench of the thirteenth aspect of this invention, the same quantity of air is allowed to be blown into a plurality of locations, thereby suppressing flotation of dust.

In a fourteenth aspect of this invention, an outdoor unit ($300$) of an air conditioner comprises the air blow system according to the twelfth aspect.

According to the outdoor unit of the air conditioner of the fourteenth aspect of this invention, exhaust balance is improved and efficiency of the outdoor unit is enhanced.

These and other objects, features, aspects and advantages of the present invention will become more apparent from the following detailed description of the present invention when taken in conjunction with the accompanying drawings.

Publications regarding this invention include Japanese Patent Application Laid-Open Nos. 8-42885 (1996), 11-94418 (1999), and 2002-54830.

BRIEF DESCRIPTION OF DRAWINGS

FIG. 5 is a block diagram showing the configuration of a conventional air blow system.

BEST MODE FOR CARRYING OUT THE INVENTION

Figure 1:
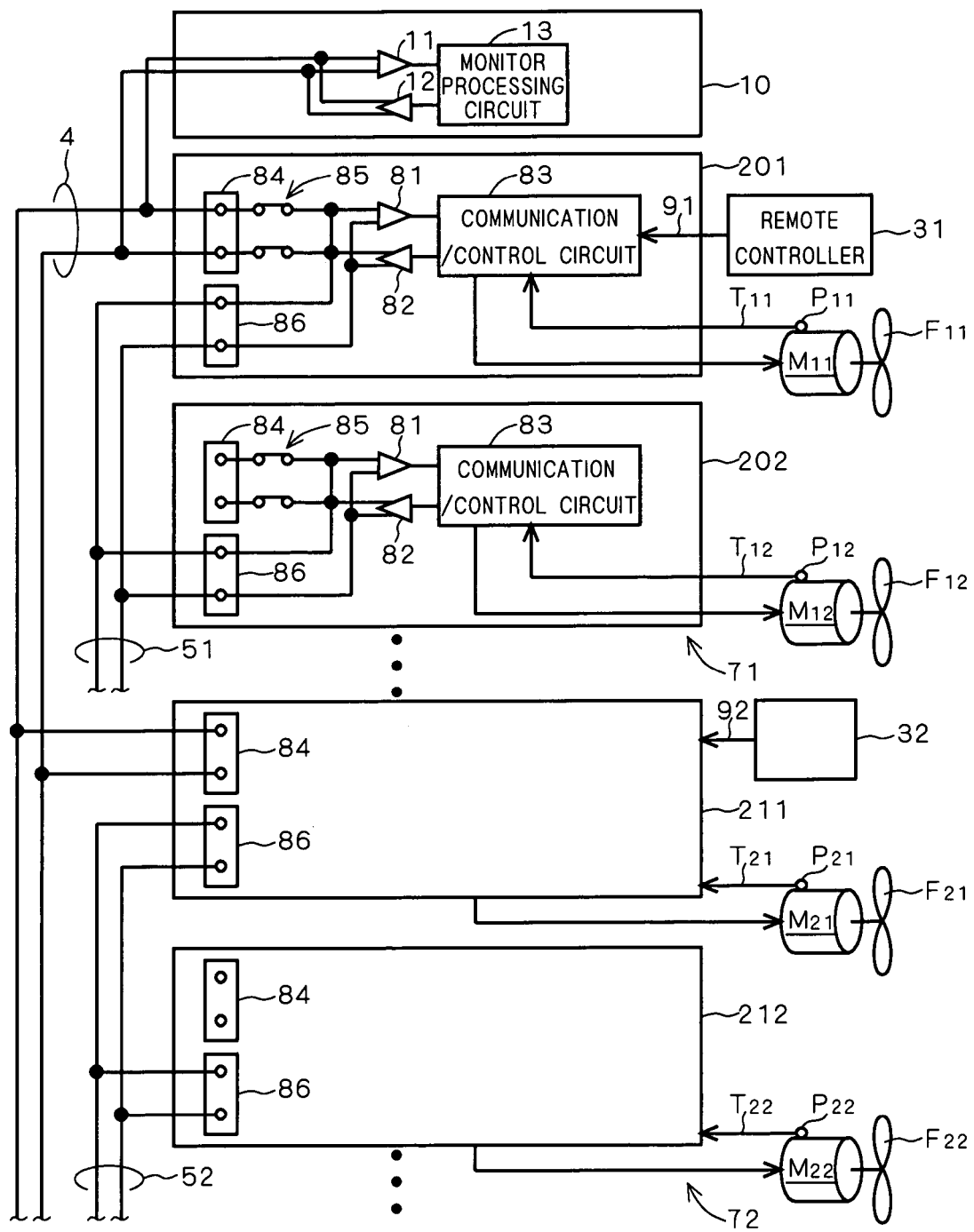
FIGS. 1 and 2 are block diagrams showing the configurations of an air blow system according to the present embodiment.

FIG. 1 is a block diagram showing the configuration of an air blow system according to the present embodiment. The air blow system includes a plurality of air blow chains 71 and 72, and a central monitoring device 10 intensively monitoring the operations of these chains that are connected to one another. The air blow chains 71 and 72 are connected to each other in parallel with respect to the central monitoring device 10 via a central monitoring line 4. The central monitoring line 4 has the function of transmitting the state of communication and the state of control of the air blow chains 71 and 72 to the central monitoring device 10. While FIG. 1 illustrates the case where the air blow chains include two chains, three or more chains may be connected in parallel.

The air blow chain 71 includes a remote controller 31, and a plurality of motor drivers 201 and 202. We can understand the motor drivers 201 and 202 as a motor driver chain. The motor drivers 201 and 202 are connected to each other in parallel in a way described later in detail. Motors $M_{11}$ and $M_{12}$ are connected correspondingly to the motor drivers 201 and 202, respectively. Fans $F_{11}$ and $F_{12}$ are attached to the motors $M_{11}$ and $M_{12}$, respectively, and rotated. While FIG. 1 illustrates the case where two motor drivers are connected in parallel, three or more motor drivers (accordingly, motors and fans) may be connected in parallel. The fans $F_{11}$ and $F_{12}$, the motors $M_{11}$ and $M_{12}$, and the motor drivers 201 and 202 are respectively designed in accordance with the same specifications.

In the air blow chain 71, the remote controller 31 which is a control circuit and the central monitoring device 10 are directly connected only to the motor driver 201. In this invention, a motor driver to which the central monitoring device 10 is directly connected is called a master driver, and all other motor drivers are called slave drivers. One master driver is set for each air blow chain. The motor driver 201 is the master driver in the air blow chain 71. The motor driver 202 and all the other motor drivers connected in parallel, if there are, are the slave drivers in the air blow chain 71.

The air blow chain 72 is configured in the same way as the air blow chain 71. The air blow chain 72 includes a remote controller 32, and motor drivers 211 and 212 which correspond to the remote controller 31, and the motor drivers 201 and 202 in the air blow chain 71, respectively. We can understand the motor drivers 211 and 212 as a motor driver chain. Motors $M_{21}$ and $M_{22}$ are connected correspondingly to the motor drivers 211 and 212, respectively. Fans $F_{21}$ and $F_{22}$ are attached to the motors $M_{21}$ and $M_{22}$, respectively, and rotated. While FIG. 1 illustrates the case where two motor drivers are connected in parallel, three or more motor drivers (accordingly, motors and fans) may be connected in parallel. The number of motor drivers connected in parallel may differ between the air blow chains 71 and 72.

The fans $F_{21}$ and $F_{22}$, the motors $M_{21}$ and $M_{22}$, and the motor drivers 211 and 212 are respectively designed in accordance with the same specifications. Those specifications may be different between the air blow chains 71 and 72. For the sake of simplicity, the following explanation is based on the assumption that the motor drivers 211 and 212 have the same configurations as those of the motor drivers 201 and 202.

In the air blow chain 72, the remote controller 32 which is a control circuit and the central monitoring device 10 are directly connected only to the motor deiver 211. The motor driver 211 is the master driver in the air blow chain 72. The motor driver 212 and all the other motor drivers connected in parallel, if there are, are the slave drivers in the air blow chain 72.

We can understand the central monitoring device 10, the motors $M_{11}$ and $M_{12}$, the motor drivers 201 and 202, and the remote controller 31 as a rotational driving system supplying rotational driving to the fans $F_{11}$ and $F_{12}$. We can understand the rotational driving system combined with the fans $F_{11}$ and $F_{12}$ as an air blow system. Or again, we can understand the rotational driving system further including the motors $M_{21}$ and $M_{22}$, the motor drivers 211 and 212, and the remote controller 32 as a rotational driving system supplying rotational driving to the fans $F_{11}$, $F_{12}$, $F_{21}$ and $F_{22}$. We can understand the rotational driving system combined with the fans $F_{11}$, $F_{12}$, $F_{21}$ and $F_{22}$ as an air blow system.

Further, we can understand the central monitoring device 10, the motor drivers 201 and 202, and the remote controller 31 as a rotational speed control system controlling the rotational speeds of the motors $M_{11}$ and $M_{12}$. Or again, we can understand the rotational speed control system further including the motor drivers 211 and 212, and the remote controller 32 as a rotational speed control system controlling the rotational speeds of the motors $M_{11}$, $M_{12}$, $M_{21}$ and $M_{22}$.

The motor drivers 201, 202, 211 and 212 each include a receiving buffer 81 and a transmitting buffer 82. The receiving buffer 81 performs the function of receiving information from the central monitoring device 10 and the other motor driver (for example, the motor driver 202 for the motor driver 201; the motor driver 212 for the motor driver 211) in the air blow chain to which it belongs. The transmitting buffer 82 performs the function of transmitting information to the central monitoring device 10 and the other motor driver.

The motor drivers 201, 202, 211 and 212 each further include a communication/control circuit 83. In the motor drivers 201 and 211, the communication/control circuits 83 are each connected to the receiving buffer 81 and the transmitting buffer 82 inside the motor drivers 201 and 211, and to the remote controllers 31 and 32 from the outside of the motor drivers 201 and 211, respectively. In the motor drivers 202 and 212, the communication/control circuits 83 are each connected to the receiving buffer 81 and the transmitting buffer 82 inside the motor drivers 202 and 212, and have no connection to the remote controllers 31 and 32.

The remote controllers 31 and 32 respectively output rotational speed instructing signals 91 and 92 setting a motor rotational speed in a digital value or an analog value. The communication/control circuits 83 in the motor drivers 201 and 211 which are the master drivers receive the rotational speed instructing signals 91 and 92 from the remote controllers 31 and 32, respectively, drive the motors $M_{11}$ and $M_{21}$ corresponding to themselves based on those signals, and in turn rotate the fans $F_{11}$, and $F_{21}$. The air blow chains 71 and 72 can adopt rotational speeds different from each other, and in that case, the rotational speed instructing signals 91 and 92 take on values different from each other. In this case, the motors can be driven at an equal rotational speed in units of air blow chains. The air blow chains 71 and 72 can naturally adopt a rotational speed equal to each other by equalizing the values of the rotational speed instructing signals 91 and 92.

The motor drivers 201, 202, 211 and 212 further include first connectors 84 and second connectors 86. In each of the motor drivers, both of the first connector 84 and the second connector 86 connect the receiving buffer 81 and the transmitting buffer 82 in parallel between themselves and the communication/control circuit 83. Switches 85 are further provided between the first connector 84, and the receiving buffer 81 and the transmitting buffer 82, which are conducting under normal conditions but are interrupted by the communication/control circuit 83 under abnormal conditions.

The respective second connectors 86 in the motor drivers 201 and 202 are connected in parallel with respect to an in-chain wiring 51. Under normal conditions, the central monitoring device 10 communicates with the communication/control circuit 83 via the central monitoring line 4 and the first connector 84, the receiving buffer 81 in the motor driver 201. Accordingly, under normal conditions, information about the state of operation of the motor driver 202 is supplied to the central monitoring device 10 via the second connector 86 in the motor driver 202, the in-chain wiring 51, the second connector 86 in the motor driver 201, the switches 85 in the motor driver 201, the first connector 84 in the motor driver 201, and the central monitoring line 4.

The central monitoring device 10 includes a receiving buffer 11, a transmitting buffer 12, and a monitor processing circuit 13. The monitor processing circuit 13 receives information from the central monitoring line 4 via the receiving buffer 11, and supplies information to the central monitoring line 4 via the transmitting buffer 12.

Likewise, the respective second connectors 86 in the motor drivers 211 and 212 are connected in parallel with respect to an in-chain wiring 52. Accordingly, under normal conditions, information about the state of operation of the motor driver 212 is supplied to the central monitoring device 10 via the second connector 86 in the motor driver 212, the in-chain wiring 52, the second connector 86 in the motor driver 211, the first connector 84 in the motor driver 211, and the central monitoring line 4.

As described above, the central monitoring device 10 can intensively monitor the operations of the air blow chains 71 and 72. Especially, the state of operation of each of the motor drivers 201, 202, 211 and 212 can be intensively monitored by setting the motor drivers 201, 202, 211 and 212 with unique identification codes, and allowing the central monitoring device 10 to recognize the identification codes.

Conversely, the rotational speed instructing signal 91 is supplied in digital value mode from the communication/control circuit 83 in the motor driver 201 to the communication/control circuit 83 in the motor driver 202 via the transmitting buffer 82 in the motor driver 201, the second connector 86 in the motor driver 201, the in-chain wiring 51, the second connector 86 in the motor driver 202, and the receiving buffer 81 in the motor driver 202. In this fashion, the respective communication/control circuits 83 in the motor drivers 201 and 202 are capable of communicating with each other in a digital value, so that the motor driver 202 which is the slave driver can drive the motor $M_{12}$ and in turn rotate the fan $F_{12}$ at a rotational speed equal to that for driving the motor $M_{11}$ by the motor driver 201 which is the master driver.

Likewise, the rotational speed instructing signal 92 is transmitted from the motor driver 211 to the motor driver 212. Accordingly, the motor driver 212 which is the slave driver can drive the motor $M_{22}$ and in turn rotate the fan $F_{22}$ at a rotational speed equal to that for driving the motor $M_{21}$ by the motor driver 211 which is the master driver.

Because the motor rotational speeds set by the rotational speed instructing signals 91 and 92 are transmitted in a digital value between the motor drivers, a plurality of motors can be driven at the same rotational speed in units of air blow chains without depending on the number of motor drivers and without depending on the characteristics of each motor driver. The rotational speed instructing signals 91 and 92 may be a digital value indicative of the value itself of the number of rotations, or may be a code corresponding to the number of rotations. Alternatively, the signals may indicate the threshold values of the upper limit and lower limit of the number of rotations. In that case, the communication/control circuits 83 included in the master drivers 201 and 211 control the numbers of rotations to fall within the range between the two threshold values.

Besides, the central monitoring device 10 can monitor the state of operations of the air blow chains 71 and 72 via the central monitoring line 4. With the central monitoring line 4 being connected to the in-chain wirings 51 and 52 via the respective first connectors 84 and second connectors 86 in the motor drivers 201 and 211, the central monitoring device 10 can intensively monitor the state of operations of all of the motor drivers 201, 202, 211 and 212.

For example, it is assumed that an abnormal condition occurred in the in-chain wiring 51 of the air blow chain 71. If left unaddressed, the abnormal condition is likely to affect the air blow chain 72 adversely via the central monitoring line 4. Upon detection of this abnormal condition, the motor drivers turn off the switches 85 in all series, conduct communication tests within chains of its own, and leave the switches 85 in all chains, conduct communication tests within series of its own, and leave the switches 85 in the OFF state when an abnormal condition is detected. The switches 85 are turned on again only when it is judged that the chains of its own is under normal conditions, thereby restarting communication. At this time, each of the motor drivers maintains the number of rotation before the occurrence of the abnormal condition. This is because the location of the abnormal condition cannot be identified if all chains remain connected. In order to avoid such adverse effect, the communication/control circuit 83 in the motor driver 201 detects the abnormal condition in the in-chain wiring 51 and turns off the switches 85 in the motor driver 201. Consequently, the central monitoring device 10 can intensively monitor the air blow chain 72, namely the state of operations of the motor drivers 211 and 212 without being hampered by the abnormal condition that occurred in the air blow chain 71.

Conversely, when an abnormal condition occurred in the air blow chain 72, the communication/control circuit 83 in the motor driver 211 detects the abnormal condition and turns off the switches 85 in the motor driver 211. Consequently, the central monitoring device 10 can be intensively monitor the air blow chain 72 namely the state of operations of the motor drivers 201 and 202 without being hampered by the abnormal condition that occurred in the air blow chain 71.

Because only the motor drivers 201 and 211 are directly connected to the central monitoring line 4 in the air blow chains 71 and 72, respectively, the switches 85 and the first connector 84 are not essential constituent requirements for the motor drivers 202 and 212. However, there is the advantage of facilitating mass production by designing the motor drivers 201 and 202, and the motor drivers 211 and 212 in accordance with the same specifications, respectively.

The motors $M_{11}$, $M_{12}$, $M_{21}$ and $M_{22}$ may be provided with rotational speed detectors $P_{11}$, $P_{12}$, $P_{21}$ and $P_{22}$, respectively, to detect rotational speeds $T_{11}$, $T_{12}$, $T_{21}$ and $T_{22}$ of the motors $M_{11}$, $M_{12}$, $M_{21}$ and $M_{22}$. The rotational speeds $T_{11}$, $T_{12}$, $T_{21}$ and $T_{22}$ are supplied to the communication/control circuits 83 in the motor drivers 201, 202, 211 and 212, respectively, to contribute to constant-speed driving control.

The rotational driving system including the rotational speed control system and the motors $M_{11}$, and $M_{12}$ (or additionally $M_{21}$ and $M_{22}$) as described above can supply rotational driving to the fans $F_{11}$ and $F_{12}$ (or additionally $F_{21}$ and $F_{22}$) at an equal rotational speed when the fans $F_{11}$ and $F_{12}$ (or additionally $F_{21}$ and $F_{22}$) which are loads on the motors $M_{11}$ and $M_{12}$ (or additionally $M_{21}$ and $M_{22}$) are equal to each other.

Moreover, the air blow system including the rotational driving system and the fans $F_{11}$ and $F_{12}$ (or additionally $F_{21}$ and $F_{22}$) as described above can blow an equal quantity of air into a plurality of locations having intake conductance and exhaust conductance equal to each other.

In one air blow chain, when a rotational speed instructing signal is transmitted from the master driver to the slave driver, the identification code of the transmission target may also be transmitted with the signal. Then, the identification code of its own and the rotational speed instructing signal that was transmitted may be returned from the slave driver set with the transmitted identification code to the master driver. This confirms whether the information transmitted from the master driver was correctly transmitted to the slave driver, and in turn allows the transmission again from the master driver to the slave driver when the information was not correctly transmitted due to contamination with noise or the like.

In the event of a failure in the slave driver, an error code indicative of the failure may be transmitted from the slave driver to the master driver. By transmitting the error code from the master driver to the central monitoring device 10, the central monitoring device 10 can recognize what kind of failure has occurred in which air blow chain and display the kind of failure in the monitor processing circuit 13.

Furthermore, the error code may be transmitted from the slave driver to the master driver together with the identification code of the slave driver in which the failure corresponding to the error code occurred. By transmitting the error code and the identification code of the slave driver from the master driver to the central monitoring device 10, the monitor processing circuit 13 can display what kind of failure has occurred in which slave driver.

The number of slave drivers may be recognized by calling the identification codes of the slave drivers in order. The mutual communication between the master driver and the slave drivers offers enhanced reliability.

Figure 2:
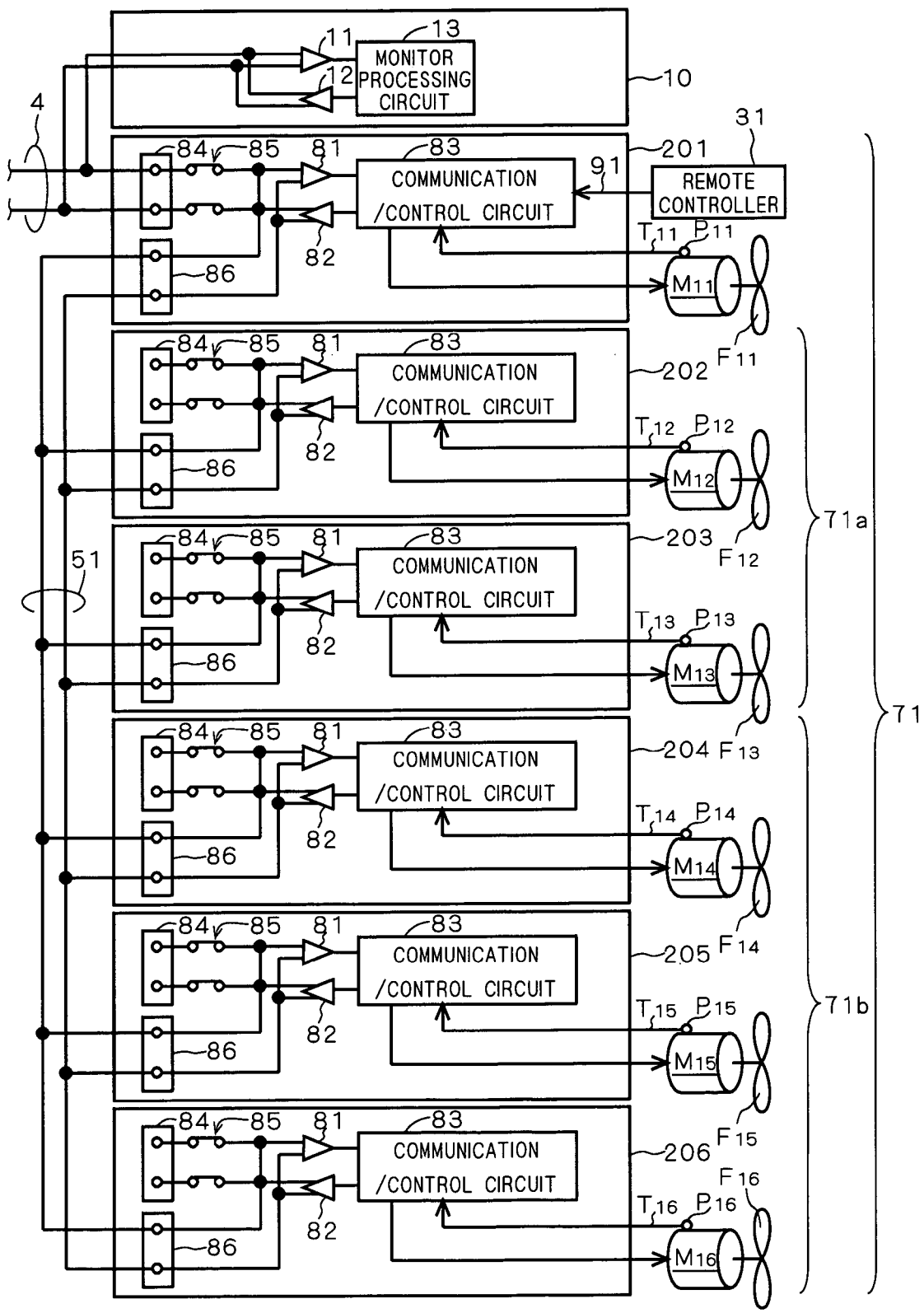

FIG. 2 is a block diagram showing another configuration of the air blow system according to this embodiment. The air blow chain 71 includes motor drivers 202 to 206 which are the slave drivers in addition to the motor driver 201 which is the master driver. As with the motor driver 201, the motor drivers 202 to 206 include the receiving buffer 81, the transmitting buffer 82, the communication/control circuit 83, the first connector 84 and the second connector 86, and the switches 85. The motor drivers 202 to 206 drive motors $M_{12}$ to $M_{16}$, respectively. Fans $F_{12}$ to $F_{16}$ are attached to the motors $M_{12}$ to $M_{16}$, respectively, and rotated.

We can understand the central monitoring device 10, the motors $M_{11}$ to $M_{16}$, the motor drivers 201 to 206, and the remote controller 31 as a rotational driving system supplying rotational driving to the fans $F_{11}$ to $F_{16}$. We can understand the rotational driving system combined with the fans $F_{11}$ to $F_{16}$ as an air blow system. We can understand the motor drivers 201 to 206 as a motor driver system. Moreover, we can understand the central monitoring device 10, the motor drivers 201 to 206, and the remote controller 31 as a rotational speed control system controlling the rotational speeds of the motors $M_{11}$ to $M_{16}$.

The slave drivers, the motors driven by the slave drivers and the fans attached to the motors in the air blow chain 71 have sub-air blow chains 71a and 71b. In FIG. 2, the sub-air blow chain 71a includes the motor drivers 202 and 203, the motors $M_{12}$ and $M_{13}$, and the fans $F_{12}$ and $F_{13}$, and the sub-air blow chain 71b includes the motor drivers 204 to 206, the motors $M_{14}$ to $M_{16}$, and the fans $F_{14}$ to $F_{16}$. We can understand the motor drivers 202 and 203, and the motor drivers 204 to 206, respectively, as separate sub-motor driver systems.

A unique identification code may be supplied to each sub-air blow chain. In one air blow chain, when a rotational speed instructing signal is transmitted from the master driver to the slave drivers in units of sub-air blow chains, the identification code indicative of the sub-air blow chain may also be transmitted with the signal. The sub-air blow chains can be controlled by different rotational speeds from one another.

Figure 3:
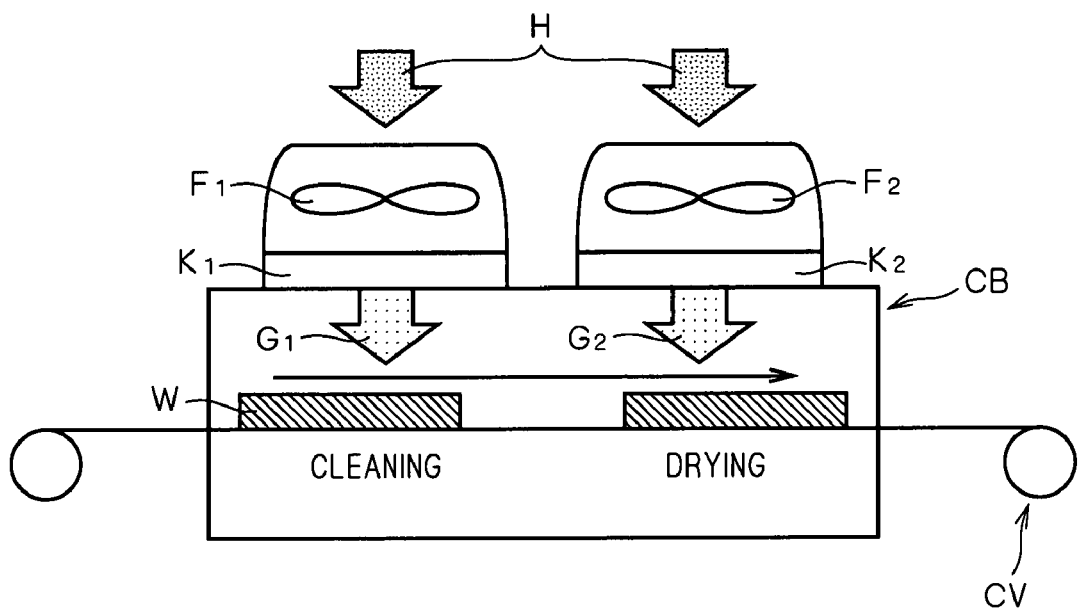
FIG. 3 is a schematic diagram showing the structure of a clean bench CB according to this invention.

FIG. 3 schematically illustrates a structure of a clean bench CB as an applicable example of this invention.

In the clean bench CB, a semiconductor wafer W is subjected to cleaning and drying processes. Specifically, the semiconductor wafer W is transferred in the direction of the arrow in the drawing by transfer means CV which adopts a conveyor, for example, and is subjected to a cleaning process, and then a drying process.

At this time, in order for the above processes to be performed in an environment with a small amount of dust, clean air $G_1$ and $G_2$ are supplied to respective positions for the cleaning process and the drying process in the clean bench CB. The clean air $G_1$ is introduced into the clean bench CB by a fan $F_1$ which takes in the outside air H and exhausts it via a filter $K_1$, and the clean air $G_2$ is introduced into the clean bench CB by a fan $F_2$ which takes in the outside air H and exhausts it via a filter $K_2$. The drawing schematically illustrates less dust in the clean air $G_1$ and $G_2$ than in the outside air H by the number of dots in the respective arrows.

When the clean air $G_1$ and $G_2$ are introduced into the same clean bench CB from a plurality of locations as described above, it is desirable that those quantities of air be set to be the same, so that flotation of dust is avoided that can come from unbalanced air flow. Because the fans $F_1$ and $F_2$ are usually designed in accordance with the same specifications, it is desirable that the rotational speeds of the fans be the same.

To this end, the fans $F_{11}$ and $F_{12}$ (or the fans $F_{21}$ and $F_{22}$) shown in FIG. 1 may be adopted as the fans $F_1$ and $F_2$ to thereby set the quantities of air to be the same. This allows the same quantity of air to be blown into a plurality of locations, thereby suppressing flotation of dust.

Figure 4:
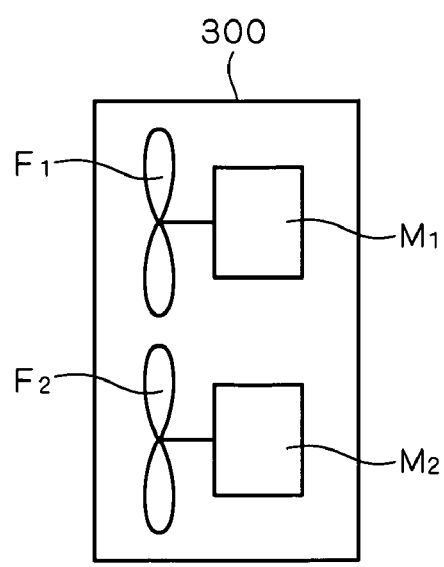
FIG. 4 is a schematic diagram showing the configuration of an outdoor unit 300 of an air conditioner according to this invention.

The air blow system is applicable not just to the clean bench CB. FIG. 4 schematically illustrates the configuration of an outdoor unit 300 of an air conditioner according to this invention. The outdoor unit 300 includes motors $M_1$ and $M_2$, and the fans $F_1$ and $F_2$ rotated by the motors, respectively. The motors $M_{11}$ and $M_{12}$ (or $M_{21}$ and $M_{22}$), and the fans $F_{11}$ and $F_{12}$ (or the fans $F_{21}$ and $F_{22}$) shown in FIG. 1 may be adopted as the motors $M_1$ and $M_2$, and the fans $F_1$ and $F_2$, respectively. The outdoor unit 300 can improve exhaust balance and enhance its efficiency.

The sub-air blow chains as shown in FIG. 2 may be included in the air blow systems adopted in the clean bench CB and the outdoor unit 300 as described above. For example, they may be adopted to different clean benches and outdoor units 300 in units of sub-air blow chains.

While the invention has been shown and described in detail, the foregoing description is in all aspects illustrative and not restrictive. It is therefore understood that numerous modifications and variations can be devised without departing from the scope of the invention.

The invention claimed is:

1. A rotational speed control system, comprising:
   at least one or more motor drive chains each comprising:
      rotational speed instructing means outputting a rotational speed instructing signal setting a motor rotational speed;
      a first motor driver receiving said rotational speed instructing signal from said rotational speed instructing means and driving a motor corresponding to itself based on said rotational speed instructing signal; and
      at least one second motor driver capable of communicating with said first motor driver in a digital value, receiving said rotational speed instructing signal from said first motor driver and driving a motor corresponding to itself based on said rotational speed instructing signal, and
   central monitoring means monitoring the operations of said first and second motor drivers in units of said motor drive chains by communicating with said first motor driver of each of said motor drive chains, wherein
   said motor drive chains include a plurality of motor drive chains, and
   said first motor driver of each of said plurality of motor drive chains interrupts communication with said central monitoring means when an abnormal condition occurs in the motor drive chain to which it belongs.

2. The rotational speed control system according to claim 1, wherein in each of said motor drive chains,
   an in-chain wiring connecting said first motor driver and said second motor driver to each other is further provided.

3. The rotational speed control system according to claim 1, wherein
   said first motor driver includes:
      a communication/control circuit driving said motor corresponding to itself based on said rotational speed instructing signal and capable of communicating with said central monitoring means;
      a connector connected to said central monitoring means; and
      switches interposed between said connector and said communication/control circuit, and
   said switches are interrupted in said motor drive chain in which an abnormal condition occurs.

4. The rotational speed control system according to claim 3, wherein
   said second motor driver includes a communication/control circuit capable of communicating with said communication/control circuit of said first motor driver in a digital value via in-chain wiring, and driving said motor corresponding to itself based on said rotational speed instructing signal.

5. A rotational speed control system, comprising:
   at least one or more motor drive chains each comprising:
      rotational speed instructing means outputting a rotational speed instructing signal setting a motor rotational speed;
      a first motor driver receiving said rotational speed instructing signal from said rotational speed instructing means and driving a motor corresponding to itself based on said rotational speed instructing signal; and
      at least one second motor driver capable of communicating with said first motor driver in a digital value, receiving said rotational speed instructing signal from said first motor driver and driving a motor corresponding to itself based on said rotational speed instructing signal, and
   central monitoring means monitoring the operations of said first and second motor drivers in units of said motor drive chains by communicating with said first motor driver of each of said motor drive chains, wherein in said motor drive chain,
   said second motor driver includes a plurality of second motor drivers, each of which is set with a unique identification code, and
   said identification codes and said rotational speed instructing signal are transmitted from said first motor driver to said second motor drivers.

6. The rotational speed control system according to claim 5, wherein
   said identification codes and said rotational speed instructing signal are transmitted from said second motor drivers to said first motor driver in said motor drive chain.

7. The rotational speed control system according to claim 5, wherein
   a code corresponding to a failure that occurred in said second motor driver is transmitted from said second motor driver to said first motor driver.

8. A rotational speed control system, comprising:
   at least one or more motor drive chains each comprising:
      rotational speed instructing means outputting a rotational speed instructing signal setting a motor rotational speed;
      a first motor driver receiving said rotational speed instructing signal from said rotational speed instructing means and driving a motor corresponding to itself based on said rotational speed instructing signal; and at least one second motor driver capable of communicating with said first motor driver in a digital value, receiving said rotational speed instructing signal from said first motor driver and driving a motor corresponding to itself based on said rotational speed instructing signal, and central monitoring means monitoring the operations of said first and second motor drivers in units of said motor drive chains by communicating with said first motor driver of each of said motor drive chains, wherein in said motor drive chain, said second motor driver is divided into a plurality of sub-motor drive chains, and each of said sub-motor drive chains is set with a unique identification code, and said identification codes and said rotational speed instructing signal are transmitted from said first motor driver to said sub-motor drive chains.

9. A rotational driving system, comprising:

the rotational speed control system recited in any one of claims 1, 2 and 3 to 8; and motors in accordance with the same specifications that are provided correspondingly to respective ones of said motor drivers and the rotational speeds thereof are controlled by said motor drivers corresponding to themselves.

10. An air blow system, comprising:

the rotational driving system recited in claim 9, and a plurality of fans in accordance with the same specifications that are provided correspondingly to respective ones of said motors and rotationally driven by said motors corresponding to themselves.

11. A clean bench (CB) comprising the air blow system recited in claim 10.

12. An outdoor unit (300) of an air conditioner comprising the air blow system recited in claim 10.

* * * * *